Dec. 30, 1969   M. K. AVEDISSIAN   3,486,677
AIR BEARING SUPPORT FOR STRAND MATERIAL HOLDER
Filed May 3, 1967   4 Sheets-Sheet 2
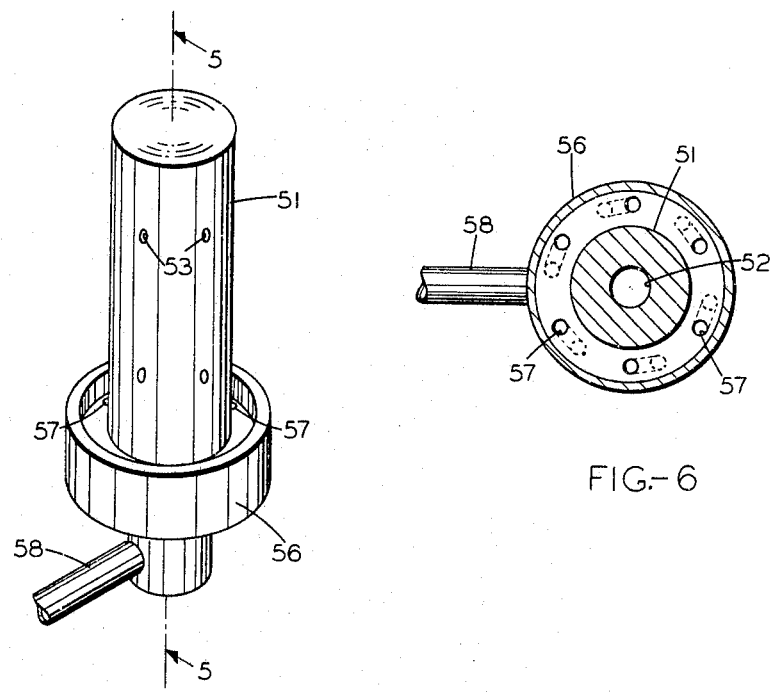
FIG.-4
FIG.-6
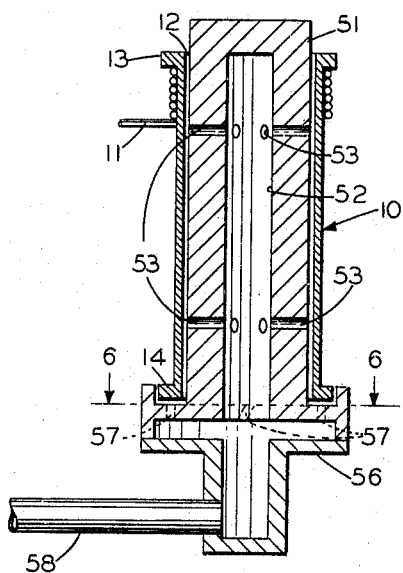
FIG.-5

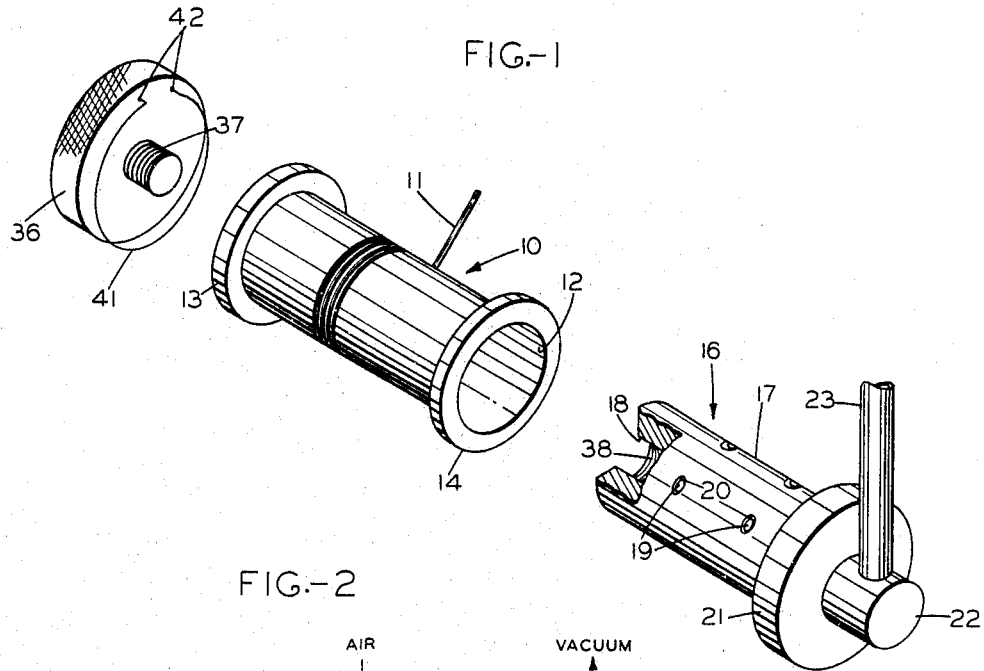
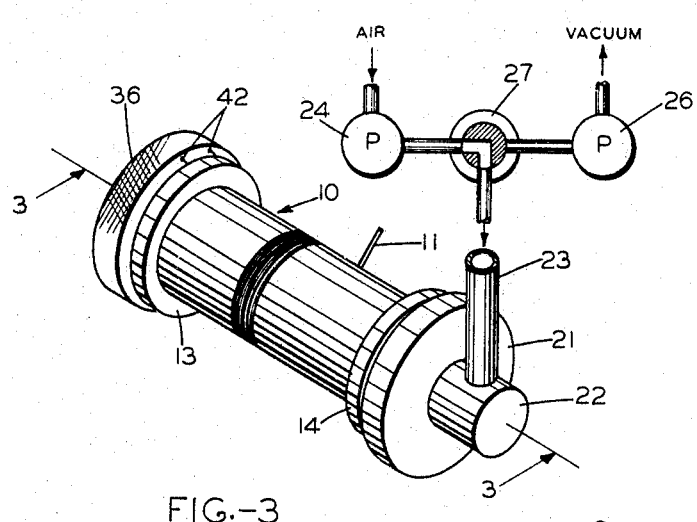
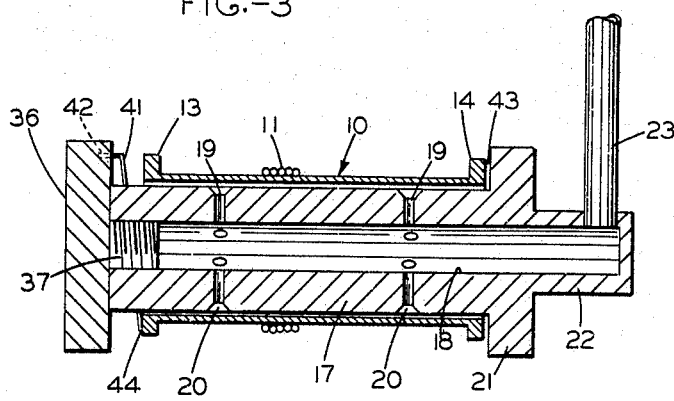

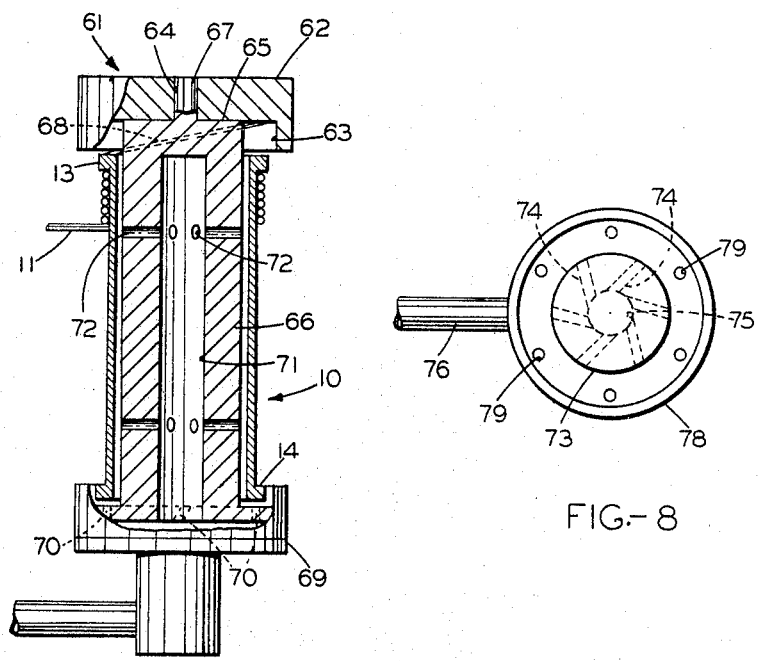
FIG.-7
FIG.-8
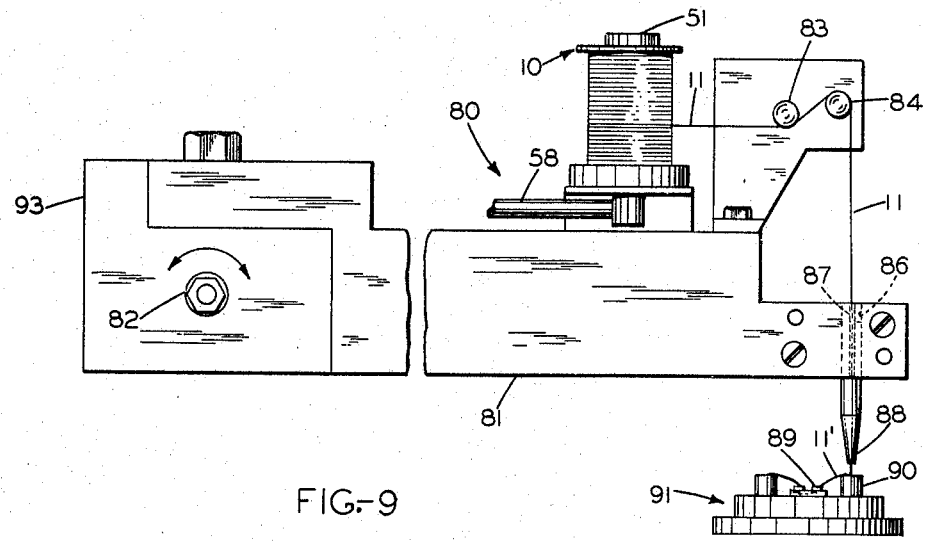
FIG.-9

Dec. 30, 1969  M. K. AVEDISSIAN  3,486,677
AIR BEARING SUPPORT FOR STRAND MATERIAL HOLDER
Filed May 3, 1967  4 Sheets-Sheet 4

United States Patent Office 3,486,677
Patented Dec. 30, 1969

3,486,677
AIR BEARING SUPPORT FOR STRAND MATERIAL HOLDER
Michael K. Avedissian, Mohnton, Pa., assignor to Western Electric Company, Incorporated, New York, N.Y., a corporation of New York
Continuation-in-part of application Ser. No. 446,664, Apr. 8, 1965. This application May 3, 1967, Ser. No. 641,101
Int. Cl. B23k 37/04
U.S. Cl. 228—3          25 Claims

ABSTRACT OF THE DISCLOSURE

An apparatus for supporting a rotatable member includes an arbor having a longitudinal passageway and radial slots for receiving the member thereon. Pressurized air is forced through the passageway and the slots to float the member on a substantially frictionless air film, while a controlled amount of drag is applied to the member to control the rotation thereof.

CROSS-REFERENCES TO RELATED APPLICATIONS

This is a continuation-in-part of application Ser. No. 446,664, filed April 8, 1965 and now abandoned.

BACKGROUND OF THE INVENTION

This invention relates to apparatus for supporting a rotatable member on a film of gas. More particularly, the invention relates to apparatus for supporting a rotatable member, such as a spool from which strand material is to be paid off, on an air bearing and applying an adjustable amount of drag for controlling the rotation of the spool. The invention also relates to apparatus for connecting the leading end of a wire between two locations on an article and then separating the wire from the second location. Accordingly, the general objects of the invention are to provide new and improved apparatus of such character.

In the manufacture of small electrical components, such as transistors, it is necessary to bond minute wires, such as 0.3 mil to 2 mils, between a very small semiconductor wafer and several upstanding terminal posts. It has been found that conventional supports for spools containing such minute wire have numerous disadvantages. In particular, a commonly used support consists of an arbor which receives a spool thereon, the arbor being supported at either end by jeweled bearings. In such an apparatus, it is necessary frequently that the mating surfaces between the arbor and the jeweled bearings be cleaned to remove foreign particles which become embedded therebetween. In order to perform such a cleaning operation or in order to insert a refill spool on the arbor, it is necessary that one of the jeweled bearings be moved relative to the other. After cleaning of the bearing surfaces and replacement of the refill spool, the jeweled bearing must be returned to a mating position with the arbor. This operation has been found to result, not infrequently, in damaged bearings. Also, the jeweled bearings and the accurate machining necessary to make such bearings add greatly to the expense.

Another disadvantage of the above prior art is the fact that the spools on which the wire is supplied customarily contain a certain amount of imbalance for which the support is unable to correct. For example, if a desired amount of wire is paid off the spool for connection between a wafer and a terminal post, but the spool is in such a position that the imbalance tends to continue the rotation of the spool, the wire is overfed. This may cause a buckling of the wire or even an unaccpetable bond between the wire and either the wafer or the terminal post. On the other hand, if after a predetermined feeding of the wire the spool is in such a position that the imbalance of the spool tends to reverse the direction of rotation of the spool, then the wire may be broken or the bonded end of the wire may be lifted from the bond. Also, the leading end of the wire may be withdrawn into the bonding apparatus which then necessitates further feeding before a bonding operation can be performed. To alleviate such spool imbalance problems, it was customary to remove the wire from the original spool and rewind the wire on an accurately balanced spool. Thus, a balancing step and a rewinding step were added to the process of manufacturing semiconductor devices.

In addition to these problems, when dealing with minute wires, it has been found on occasions that the wire which is wound on a spool becomes overheated and actually becomes welded to the other turns of wire on the spool. This problem can be alleviated by maintaining a low ambient temperature through the use of various cooling means but this, of course, requires additional equipment and expense.

SUMMARY OF THE INVENTION

Another object of this invention is to provide new and improved apparatus for supporting a rotatable member on a substantially frictionless air film which also maintains the mating surfaces in a clean and cool condition.

It is a further object of the invention to provide a support having an air flow therethrough for maintaining a rotatable member on an air film while the member is rotating and for stopping the air flow and pulling a partial vacuum through the support to stop the rotation of the member.

It is another object of the invention to provide apparatus which supports a rotatable member on an air film with the longitudinal axis of the member in a vertical direction to minimize the adverse effects of imbalance of the member.

It is a further object to provide a support having facilities for applying a precise amount of drag to a rotatable member having strand material thereon to prevent overfeeding or underfeeding of the strand.

Another object is to provide a support for a rotatable member wherein it is not necessary to have close tolerances between the member and the support.

With these and other objects in mind, an apparatus in accordance with the invention includes an arbor having a longitudinal passageway and radial slots for receiving a rotatable member thereon. Pressurized air is forced through the passageway and the slots to float the member on a substantially frictionless air film, while a desirable amount of drag is applied to the member to control the rotation thereof.

More specifically, the invention contemplates an apparatus for supporting a rotatable member, such as a spool containing a supply of wire which is to be paid off, on an air film so that there is no metal-to-metal contact of the mating parts. The support includes an arbor having a longitudinally extending passageway which communicates with symmetrically disposed and radially extending slots. One end of the passageway is connected to facilities for either providing a supply of pressurized air or for pulling a partial vacuum through the passageway. In one embodiment, the arbor and the spool are positioned horizontally and a retaining collar in the other end of the passageway has a fine spring mounted thereon for varying the drag on the spool.

In another embodiment, the arbor and the spool are positioned vertically and angular ports are provided through the base of the arbor through which air is directed to impinge on the spool for lifting the spool off the base and for applying a drag to the spool. In a modification of the latter embodiment, a cap having a spring is provided for applying additional drag to the spool.

In another embodiment, the arbor and the spool are positioned vertically, and the arbor has a longitudinally extending passageway which communicates with angularly extending slots. The air passing through the slots provides an air film for floating the spool on the arbor and for applying a drag to the spool. Additionally, vertical ports are provided in the base of the arbor for lifting the spool from the base.

In still another vertical embodiment, the arbor has a longitudinally extending passageway which communicates with radial slots and vertical ports. The air passing through the slots provides an air film for floating the spool concentrically on the arbor and the ports lift the spool from the base of the arbor. A precisely controlled amount of drag is applied to the spool by a cap which rests on the top of the arbor, the cap having a fine spring which contacts the upper surface of the spool.

In yet another embodiment, especially in conjunction with a vertically positioned arbor and spool, a precision flanged adapter is inserted into the axial hole of the spool, at one end thereof, so that the precision flange of the device adjoins a flange of the spool. Thus, a spool having an imprecise flange at one of its ends can be adapted so that the spool can be supported by an air bearing.

In all the above embodiments, facilities are provided for terminating the flow of air and for pulling a partial vacuum through the passageway and slots and/or the ports for stopping the rotation of the spool. Other embodiments, wherein the various drag applying facilities are further combined, are within the scope of the invention.

BRIEF DESCRIPTION OF THE DRAWINGS

Other objects, advantages and aspects of the invention will become apparent by reference to the following detailed specification and drawings of specific embodiments thereof, wherein:

FIG. 1 is an exploded perspective view of an arbor for receiving a spool thereon and having a retaining collar with a drag applying device for reception in the end of the arbor;

FIG. 2 is a perspective view of the embodiment shown in FIG. 1 after the apparatus has been assembled and further showing facilities for supplying a pressurized fluid or for pulling a partial vacuum;

FIG. 3 is a cross-sectional view taken along line 3—3 of FIG. 2 and showing a longitudinal passageway which connects with radially extending slots, the passageway receiving the retaining collar in the end thereof;

FIG. 4 is a perspective view of a second embodiment, with the spool removed, wherein a vertically positioned arbor has a base with angularly extending ports for applying a fluid drag to the spool;

FIG. 5 is a cross-sectional view taken along line 5—5 of FIG. 4, with the spool added, showing the arrangement of a longitudinal passageway, radial slots, and the angularly extending ports;

FIG. 6 is a cross-sectional view taken along line 6—6 of FIG. 5 and showing the angular ports for providing a fluid drag to the spool;

FIG. 7 is a partially cut away side elevation view of a third embodiment having angular ports in the base of the arbor and including a weighted member supported on the upper end of the arbor with a drag applying device;

FIG. 8 is a plan view of a fourth embodiment, without a spool, showing slots extending angularly from a longitudinal passageway for applying a fluid drag to a spool;

FIG. 9 is a side elevation view of a bonding apparatus having a spool of wire vertically mounted on an air bearing of the type shown in FIG. 5;

FIRST EMBODIMENT

Figure 10:
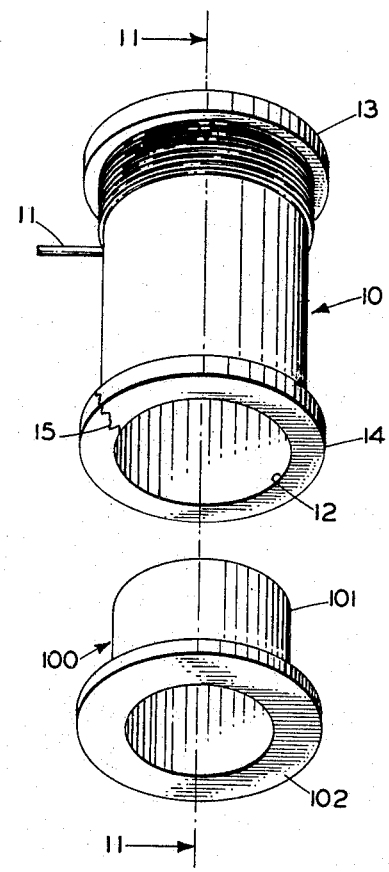
FIG. 10 is an exploded perspective view of a machined adapter for reception within a wire spool having a defective flange.

Referring to the drawings and, more particularly, to FIG. 1, there is shown a spool 10 having a supply of wire 11 wound thereon. The spool 10 has a longitudinally extending cavity 12 on which the spool 10 is supported for rotation so that closely controlled increments of wire 11 may be fed from the spool. The spool also has a pair of flanges 13 and 14, one at either end.

The apparatus for supporting the spool 10 is shown generally at 16 and includes an arbor 17 having a longitudinally extending passageway 18 (FIG. 3) which connects with a plurality of radially extending slots 19—19 so that air supplied through the passageway 18 passes out through the radial slots 19—19 and impinges against the body of the spool 10. The slots 19—19 are spaced symmetrically around the arbor 17 in two rows and are flared at their ends as shown at 20—20. The arbor also includes an enlarged base 21 connected at one end of the arbor. The base 21 is provided with a fitting 22 which receives a section of tubing 23. The tubing 23 is connectable to an air pump 24 (FIG. 2) or a vacuum pump 26 through a three-way valve 27. Therefore, either pressurized air or a partial vacuum is provided in the tubing 23 depending on the positioning of the valve 27. The air acts to support the spool 10 on the arbor 17, while the vacuum acts to stop the rotation of the spool 10 by clamping the spool to the arbor 17.

A retaining collar 36 (FIG. 3) having a threaded stud 37 is mounted in a threaded end 38 of the passageway 18. The retaining collar 36 is provided with a fine spring 41, made out of a material often termed "piano wire," which is secured in a pair of apertures 42—42, which receive the ends of the spring 41 with a snug fit. The spring 41 is a drag applying member which makes a point contact as shown at 44 (FIG. 3) with the flange 13 of the spool 10 for applying a frictional force which is in opposition to the rotation of the spool 10 as the wire 11 is being paid off. This drag is desirable in that it impedes the continued movement of the spool 10 after each increment of wire 11 is fed from the spool.

In FIG. 3, it may be seen that a space 43 is achieved between the flange 14 and the base 21 under operating conditions as the pressurized air seeks as exit from the confines of the arbor 17. The air passing therebetween provides a thrust bearing for the spool 10 which acts in opposition to the longitudinal force which the spring 41 applies. The width of the space 43 is, of course, determined by the pressure of the air and the force which the spring 41 applies against the flange 13, among other things. The essential feature is that the force exerted by the air exiting from the slots 19—19 must be sufficient to move the spool 10 to the left (FIG. 3) against the urging of the spring 41 so that the flange 14 does not make metal-to-metal contact with the base 21 of the arbor 17. In addition to the air that passes between the flange 14 and the base 21, some of the air escapes between the collar 36 and the flange 13. While this may be an appreciable percent of the total air supplied, it has been found that an effective thrust bearing is established in the space 43 to prevent metal-to-metal contact. Thus, as the air exits from the radial slots 19—19, all the surfaces of the spool 10 are floated on an air film. It is also desirable that the radial slots 19—19 be symmetrically disposed on the arbor 17, both on the longitudinal axis and the transverse axis of the arbor 17, so that the spool 10 is substantially concentric with the arbor 17 when the air is being fed through the radial slots 19—19.

OPERATION

As the wire 11 is paid off the spool 10, the spool is supported on an air film which is supplied by the air pump 24 and which is essentially frictionless. The only opposition to the rotation of the spool 10 is that which is provided by the spring 41 and this may be adjusted by varying the position of the collar 36. When it is desired to cease paying off wire 11, the position of the three-way valve 27 is reversed so that the pressurized air is terminated and the vacuum pump 26 is effective to pull a partial vacuum through the tube 23, the passageway 18 and the radial slots 19—19 to clamp the spool 10 against the exterior surface of the arbor 17. On commencing of another cycle, the valve 27 is again reversed to feed pressurized air through the radial slots 19—19 to support the spool 10 in a substantially frictionless manner with the exception of the drag which the spring 41 applies. It should be understood that it is not necessary that a partial vacuum be pulled in order to stop the rotation of the spool 10, and that the retaining collar 36 may be adjusted in the threaded end 38 of the longitudinal passageway 18 so that the spring 41 applies a sufficient amount of drag to bring the spool 10 to a stop without overfeeding or underfeeding the wire 11.

SECOND EMBODIMENT

In an alternative embodiment (FIGS. 4–6), there is shown an upstanding arbor 51 which is provided with a longitudinally extending passageway 52 and a plurality of radially extending slots 53—53 which are symmetrically positioned around the periphery of the arbor 51. The arbor 51 includes an enlarged base 56 which is provided with angularly directed ports 57—57 spaced concentrically around the longitudinal axis of the arbor 51. The ports 57—57, as well as the passageway 52 and the slots 53—53, are connected to a tube 58 through which a supply of pressurized air is fed by an arrangement similar to that shown in FIG. 2. The ports 57—57 are directed at such an angle that the air exiting therefrom impinges against the bottom flange 14 (FIG. 5) of the spool 10 and provides a force having a horizontal component in a direction opposite to the direction of rotation of the spool 10 during wire pay-off. In FIG. 6, the ports 57—57 have a horizontal component directed in a clockwise direction. Therefore, by paying off the wire 11 so as to rotate the spool 10 in a counterclockwise direction, the air exiting from the ports 57—57 applies a drag which acts in opposition to the rotation and which prevents uncontrolled rotation of the spool 10 on the arbor 51.

The air exiting from the ports 57—57 also has a vertical component which applies an upward force to the spool 10 to provide a thrust bearing which maintains the flange 14 out of metal-to-metal contact with the base 56. The spool 10 is separated from the arbor 51 by the floating action which is accomplished by the air passing through the passageway 52 and the slots 53—53 and this is similar to that disclosed with reference to FIGS. 1–3. However, this embodiment has the advantage of minimizing the effect of any imbalance which may exist in the spool 10. Thus, while in the first embodiment, an imbalance in the spool 10 might tend to produce overfeeding or, on the other hand, tend to break the wire 11 or the bond, it should be clear that the vertical arrangement of the arbor 51 as disclosed in FIG. 5 eliminates these tendencies.

In this embodiment, there is no metal-to-metal contact between the spool and the arbor 51 during operating conditions. The only drag is that provided by the air exiting from the angular ports 57—57. The pressure of the air is controlled so that on cessation of the paying off of the wire 11, the spool 10 will come to a stop and there is no appreciable overfeeding of the wire 11. If, however, it is desired to more rapidly bring the spool 10 to a stop, the supply of pressurized gas through the tube 58 is terminated and a vacuum is pulled through the tube 58 in a manner similar to that disclosed in the first embodiment. This brings the bottom surface of the spool 10 and the top surface of the base 56 into contact to stop the rotation of the spool 10. If the spool is not perfectly centered on the arbor 51, it is possible that the wall of the cavity 12 of the spool 10 will also be brought into contact with the arbor 51 by the action of the vacuum being pulled through the slots 53—53.

THIRD EMBODIMENT

In another embodiment (FIG. 7), there is shown an apparatus similar to that of FIG. 4 with an additional drag applying member generally designated by the numeral 61. The member 61 includes a cap 62 having a hollow portion 63 and a central aperture 64. The cap 62 rests on an upstanding end 65 of an arbor 66 which has a plug 67 for reception in the aperture 64 for centering and retaining the cap 62 on the arbor 66. The cap 62 is provided with a drag applying spring 68 which makes a point contact with the flange 31 of the spool 10. The cap 62 may be removed readily from the arbor 66 to allow insertion of a spool 10 on the arbor 66 after the exhaustion of the wire 11 on a preceding spool. In this embodiment, a base 69 of the arbor 66 is also provided with angularly extending ports 70—70 through which pressurized air is passed to impinge on the flange 14. Likewise, a longitudinal passageway 71 communicates with a plurality of radial slots 72—72 to float the spool 10 concentrically on the arbor 66.

In this embodiment, it should be noted that whether spool 10 rotates in a clockwise or counterclockwise direction as the wire 11 is paid off, the spring 68 applies a drag which acts in oppostion to the rotation of the spool 10. However, depending on the direction in which the spool 10 is rotated as the wire 11 is paid off, the air exiting from the ports 70—70 applies a force which either adds to or subtracts from the drag which the spring 68 applies. The effect of the ports 70—70, whether additive or subtractive, is reversed by simply inverting the spool 10 on the arbor 51 as this reverses the direction of rotation of the spool 10 as the wire 11 is paid off. Thus, the drag which is applied to the spool may be varied between one of two values, i.e., the sum of two drags or the difference of the two drags, without either a change in the pressure of the air passing through the arbor 66, a change in the weight or position of the drag applying member 61 or the spring 68.

Likewise, the drag may be precisely varied by increasing the flow of air through the ports 70—70, as this further lifts the spool 10 and increases the compression of the spring 68. As the spring 68 is further compressed, the drag on the spool 10 is increased.

FOURTH EMBODIMENT

In FIG. 8, there is shown another embodiment wherein the spool (not shown) is supported on a vertical arbor 73 having angular slots 74—74 extending from a longitudinal passageway 75. Pressurized air is supplied from a section of tubing 76 of the passageway 75 and out through the angular slots 74—74 to float the spool concentrically on the arbor 73. Assuming that the spool rotates in a counterclockwise direction as the wire is paid off, the air exiting from the slots 74—74 has a force component in a clockwise direction which applies a drag in opposition to the rotation of the spool. This drag, as in the other embodiments, prevents the spool from continually rotating at the cessation of a wire feeding operation. Instead, the spool comes to a controlled stop, thus preventing overfeeding or underfeeding of the wire. Within limits, the air pressure may be varied to increase or decrease the drag and thereby control the stopping time.

Additionally, the arbor has a base 78 which is provided with a plurality of vertically extending ports 79—79 which are in communication with the pressurized air supplied through the section of tubing 76. Thus, the air exiting from the ports 79—79 lifts the spool from the base 78 and provides an air bearing having no metal-to-metal contact. Since the ports 79—79 are vertical, the air exiting therefrom provides substantially no drag, the only drag on the spool being that provided by the air from the angular slots 74—74. As in the other embodiments, sufficient drag is applied to stop the rotation of the spool to allow controlled feeding of short increments of wire. In addition, if more rapid stopping is desired, a vacuum may be pulled through the section of tubing 76 to bring the metal surfaces together.

FIFTH EMBODIMENT

With regard to the aforesaid embodiments, especially where the spool is rotated about vertical axis, difficulties may arise due to an imperfection or an irregularity at one of the flanges (usually the lowermost flange) of the spool. A deformation, or foreign substance such as lacquer, on the surface of the flange can cause the spool to fail to float on an air film.

A commercially available spool 10, as illustrated in FIG. 10, may contain an irregularity 15 such as a deformation, etc., at its lowermost flange 14. Such an imperfect spool can be used with a vertical oriented arbor, as described in preceding embodiments, by fitting the spool with a precision flanged adapter 100, having a sleeve 101 which fits within the axial hole or cavity 12 of the spool 10 so that the precision machined flange 102 of the device 100 adjoins and covers the flange 14 of the spool 10. With the adapter 100 fitted into the spool 10, the overall combination of spool and device provides for ease in cooperation with the air bearing which would otherwise not occur with an imperfect spool.

Figure 11:
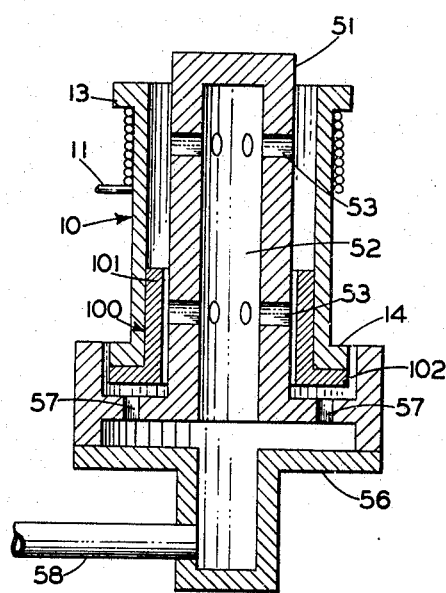
FIG. 11 is a cross-sectional view taken along line 11—11 of FIG. 10, showing an arrangement similar to that shown in FIG. 5, with the adapter of FIG. 10 in place.

Referring to FIG. 11, there is shown apparatus substantially as shown in FIG. 5 including an arbor 51 having a central longitudinal passageway 52 therein and a plurality of radially extending slots 53—53 which communicate therewith. The arbor 51 is vertically oriented and integrally communicates with a base 56 which is provided with upwardly oriented angularly directed ports 57—57 for communication with the lowermost flange of the spool 10. The tube 58 communicates with the longitudinal passageway 52, providing air to the radial slots 53—53 and the angular ports 57—57. A spool 10 containing wire 11 wound about its periphery is oriented around the arbor 51 in a manner similar to that described in FIG. 5. In addition, the lowermost flange 14 of the spool 10 contains a deformation or other imperfection 15 which, but for the adapter 100, would cause the spool 11 to lose its potential air bearing relationship with regard to the arbor 51. With the adapter in place, as air is applied through the tube 58 and through the angular ports 57—57, the air emanating from the ports 57—57 encounters the precision surface of the flange 102. In similar fashion, the air emitting from the radial slots 53—53 at the lowermost end encounters the precision surface of the sleeve 101 of the adapter 100. Since the air emanating from the respective ports and slots encounters smooth precision surfaces, the spool 10 becomes properly airborne and rotates around the arbor 51 and above the base 56 without physical contact thereto.

Thus, by inserting the precision flanged adapter into a commercial spool, the commercial spool can readily be used on the air bearing as described. This makes unnecessary the use of precision spools.

COMBINATION OF AIR BEARING AND BONDING APPARATUS

Referring to FIG. 9, there is shown a bonding apparatus 80 with which the instant invention may be advantageously combined. The apparatus includes a spool 10 which is mounted on a lever 81 for pivotal movement on a bearing 82. Wire 11 may be fed from the spool 10 which is supported on an arbor 51 such as that shown in FIGS 4–6. The wire 11 is fed over a pair of guides 83 and 84 and down through an aperture 86 in the lever 81 and into a longitudinally extending passageway 87 in a split tip bonding needle 88. By utilization of such a bonding apparatus 80, wire 11' may be connected between a semiconductor wafer 89 and a terminal post 90 of a transistor 91, for example.

An apparatus similar to that shown in FIG. 9 and suitable for use with the instant invention is disclosed in applicant's copending application, Ser. No. 322,176, filed on Nov. 7, 1963, now Patent No. 3,313,464, issued Apr. 11, 1967. Another apparatus with which applicant's spool holder can be employed advantageously is disclosed in R. P. Clagett Patent 3,128,648 entitled "Appratus for Joining Metal Leads to Semiconductive Devices," issued on Apr. 14, 1964. The above cited application and patent disclose in detail bonding apparatus and methods with which the instant spool support is particularly suited to cooperate and they are expressly incorporated herein.

Precise positioning of the bonding needle 88 with respect to the transistor 91 to which the wire 11 is to be bonded is accomplished by connecting an end 93 of the lever 81 to a micromanipulator (not shown) which is operator controlled. By use of the micromanipulator, the bonding apparatus 80 is moved forward, backward, and in both lateral directions.

Thus, after a bond (for example, a thermocompression bond) has been performed between the wafer 89 and the wire 11, the bonding needle 88 is moved laterally to pay off wire 11 from the spool 10. When the bonding needle 88 is properly positioned over the terminal post 90, another bond is performed to connect a section of the wire 11' between the wafer 89 and the post 90. It is during the period when the needle is being moved laterally that the substantially frictionless air bearing provided by the arbor 51 is most important. Likewise, when the bonding needle stops over the post 90, it is very desirable that the spool 10 cease to pay off wire 11 to avoid an excess of wire which would necessarily buckle between the bonding needle 88 and the post 90. This is effectively accomplished by the various drag applying facilities disclosed in the preceding five embodiments in FIGS. 1–8 and 10–11. In the same sense, the drag applying facilities prevent retrograde movement of the wire 11 into the bonding needle 88 which might be caused by imbalance of the spool 10, for example. This is particularly so when the spool 10 is mounted on a horizontal arbor as disclosed in FIGS. 1–3.

When the bond is formed on the post 90, the strength of the wire at that point is weakened with respect to the wire which remains in the bonding needle 88. This is so because of the configuration of the tip of the needle 88 or because facilities are provided for actually severing the wire at that point. In either case, by pulling a partial vacuum through the tube 58 and the arbor 51 to lock the spool 10 to the arbor, movement of the bonding apparatus 80 away from the transistor 91 effects a separation of the wire 11 (in the needle) from the wire 11' (between the wafer 89 and the post 90) without injury to the bond which was formed.

SPECIFIC EXAMPLE

In a specific example of the invention, a vertical arbor was provided with radially extending slots, such as elements 53—53 in FIG. 4. The base of the arbor had vertically extending ports, such as elements 79—79 in FIG. 8. A cap, such as element 62 in FIG. 7, provided the necessary drag. A ⅛ inch outside diameter section of tubing (1/16 inch inside diameter) was connected to the enlarged base of the arbor. The inside diameter of the longitudinal passageway of the arbor was ¼ inch and there were two rows of slots, each row having six slots of 15 mils diameter symmetrically disposed on the arbor.

The ends of the slots were flared so that the air passing therethrough would act on a larger area of the spool. The spool was made of aluminum, weighed approximately one gram, and had an inside diameter of ½ inch. The wire on the spool was 0.5 mil in diameter. The clearance between the spool and the arbor was approximately 0.015 inch, although this could be reduced to approximately half that value without substantially affecting the operation of the support. When the precision flanged adapter is used with the spool, the clearance between the inner surface of the sleeve and the arbor was in the neighborhood of 0.010 to 0.015 inch. It should be noted that these clearances are much in excess of those used in the past wherein clearances of 0.001 inch and less were necessary. This is because the instant invention utilizes the "jet action" on dynamic forces of the air; whereas, previous air bearings have utilized the viscosity of the air to provide a thin film on which the rotating member was supported.

The instant apparatus was found effective for handling spools which had an imbalance in the range of 2½ to 4 milligram-inches, i.e., the spools, when supported horizontally, required 10 to 16 milligrams be placed ¼ of an inch from the longitudinal axis of the spool to statically balance the spool. This range does not represent the limits of the imbalance which can be corrected by this specific embodiment, but merely the range over which it was tried and found effective.

In the enlarged base of the arbor, there were six equally spaced vertical ports on a $19/64$ inch radius from the longitudinal axis of the arbor, each port being 25 mils in diameter. The drag was supplied by the cap on which was mounted a 6 mil spring of "piano wire." The cap was adjusted so that with the lower flange of the spool resting on the enlarged base of the arbor, the spring just touched the upper flange of the spool. With the spring in such a position, the air pump was turned on to supply approximately ten cubic feet of air per hour through the section of the tubing. This was sufficient to lift the spool and separate the lower flange of the spool from the base of the arbor, provide an air film between the vertical surfaces of the spool and the arbor so as to prevent all metal-to-metal contact therebetween, and compress the spring on the cap to a slight degree to provide enough frictional drag to control the rotation of the spool. A drag between 8 and 18 milligrams has been found to be most effective, although operation at a somewhat lower or higher amount of drag is possible.

It should be pointed out that, with the above-noted clearances between the arbor and the spool and with the relatively large quantity of gas passing through the various slots and ports, the instant apparatus utilizes the dynamic forces or the velocity head of the gas to lift the spool and provide an air bearing; whereas in the past, it has been customary to utilize the static pressure of the gas. This is more readily understood by referring to the following equation:

$$Q = P + (2g/a) v^2 \text{ in which;}$$
$Q$=unit pressure (lbs./in.$^2$)
$P$=static pressure (lbs./in.$^2$)
$a$=specific gravity of the gas (lbs./in.$^3$)
$g$=acceleration of gravity (in./sec.$^2$)
$v$=velocity of the gas (in./sec.)

By utilizing the forces developed by the velocity head which are a function of $v^2$, it is possible to have much larger clearances between the moving parts and still maintain a sufficient film of gas on which to support the spool. Likewise, the relatively large flow of gas aids in cooling the spool and the wire, and in maintaining the mating surfaces in a clean condition.

With such an arrangement, it has been found that the spool will freely rotate as the wire is being paid off the spool for a bonding operation, but at the cessation of the feeding, the spool comes to a stop without overfeeding or underfeeding. If it is desired to stop the spool even more quickly, a partial vacuum may be pulled through the section of tubing. It is to be understood that while all the embodiments have been described as operating on air, other gases such as "forming gas" (92% nitrogen and 8% hydrogen by volume), pure nitrogen, or many others can be used.

Also, it is to be understood that numerous other combinations of the various drag applying facilities, i.e., the angular slots, angular ports, and the spring device, may be employed without departing from the scope of the invention. For example, the angular slots and angular ports may be combined, or all three drag applying facilities may be employed. Numerous other drag applying facilities may be provided, for example, an eddy current brake. In such an embodiment, the spool is supported on a film of air and an electromagnet is positioned adjacent the rotating spool so that the spool is located in the lines of flux of the magnet.

It is to be understood that the above-described arrangement of apparatus and construction of elemental parts are simply illustrative of an application of the principles of the invention, and many other modifications may be made without departing from the invention.

What is claimed is:

1. Apparatus for supporting a rotatable member, which comprises:
   an arbor having a longitudinally extending passageway and radially extending slots communicating therewith, the arbor being designed to receive the rotatable member thereon;
   means for supplying pressurized gas to the passageway and out through the radial slots to float the rotatable member out of contact with the arbor;
   means for communicating the gas exiting from the radial slots to an area between an end of the rotatable member and an end portion of the arbor to provide a gas thrust bearing; and
   means for applying a drag to the rotatable member in opposition to the direction of rotation thereof to effect controlled rotation.

2. Apparatus as recited in claim 1 wherein means are provided for stopping the rotation of the member, which includes:
   means for terminating the supply of pressurized gas; and
   means for pulling a partial vacuum through the passageway and radial slots to clamp the rotating member against the arbor.

3. Apparatus as recited in claim 1 wherein the means for applying drag to the rotatable member includes:
   a retaining collar secured to the other end of the arbor; and
   a resilient member mounted on the collar for engagement with the rotatable member to apply a frictional drag to the member.

4. Apparatus as recited in claim 3 wherein said collar is adjustably mounted on the arbor for varying the amount of frictional drag on the rotatable member.

5. Apparatus as recited in claim 1 wherein the radially extending slots extend outwardly toward the periphery of the arbor at an angle such that the gas exiting therefrom acts in opposition to the movement of the rotatable member to apply an additional drag thereto.

6. Apparatus as recited in claim 1, further comprising a flanged adapter fitted to the end of the rotatable member adjacent to the gas thrust bearing, with the flange covering that end of the rotatable member, the flange having a smooth outer surface to enhance the thrust bearing effect.

7. Apparatus for supporting a rotatable spool having a supply of wire thereon which is to be paid out and a flange at each end, which apparatus comprises:
   an arbor having a longitudinally extending passageway and radially extending slots communicating therewith, the arbor being adapted to receive the spool thereon;

means for supplying pressurized gas to the passageway and out through the radial slots to float the spool out of contact with the arbor;

means for communicating the gas exiting from the radial slots to an area between one of the flanges and an end portion of the arbor to provide a gas thrust bearing; and means for applying a drag to the other flange of the spool in opposition to the direction of rotation to effect controlled rotation thereof.

8. Apparatus as recited in claim 7 wherein the means for applying drag includes:
   a retaining collar mounted on the arbor adjacent the other flange of the spool; and
   a resilient member mounted on the collar for engagement with the adjacent flange to apply a frictional drag to the spool.

9. Apparatus as recited in claim 7 wherein the radially extending slots extend outwardly toward the arbor at an angle such that the gas exiting therefrom acts in opposition to the movement of the spool to apply a drag thereto.

10. Apparatus as recited in claim 7 wherein said passageway and slots are disposed on the arbor in an essentially symmetrical pattern so that the gas exiting from the slots applies equal forces on the spool in all directions.

11. Apparatus as recited in claim 7, further comprising a flanged adapter having a hollow sleeve fitted into the axial hole of the spool at the end adjacent to the gas thrust bearing, the adapter further having an end flange on the sleeve designed to cover the end flange of the spool, the adapter flange having a smooth outer surface to enhance the thrust bearing effect.

12. Apparatus for supporting a rotatable member, which comprises:
   a vertically disposed arbor having a longitudinally extending passageway and radially extending slots communicating therewith, the arbor being adapted to receive the rotatable member thereon;
   means for supplying pressurized gas to the passageway and out through the radial slots to float the rotatable member out of contact with the arbor;
   said radially extending slots being evenly spaced around the periphery of the arbor to support the rotatable member concentrically on the arbor;
   means for communicating the gas from the passageway to an area between the bottom end of the rotatable member and an end portion of the arbor so as to provide a gas thrust bearing; and
   means for applying a drag to the rotatable member in opposition to the direction of rotation to effect controlled rotation thereof.

13. Apparatus as recited in claim 12 wherein said means for applying a drag includes:
   a retaining collar mounted at the other end of the arbor; and
   a resilient member mounted on the collar for engagement with the rotatable member to apply a frictional drag to the member.

14. Apparatus as recited in claim 12, which comprises:
   means for terminating the supply of pressurized gas; and
   means for pulling a partial vacuum through the passageway, radial slots and communicating means to clamp the rotatable member against the arbor.

15. Apparatus as recited in claim 12, further comprising a flanged adapter fitted to the bottom end of the rotatable member, with the flange covering that end, the flange having a smooth outer surface to enhance the thrust bearing effect.

16. Apparatus for supporting a rotatable member, which comprises:
   a vertically disposed arbor having a longitudinally extending passageway and outwardly extending slots communicating therewith, the arbor being adapted to receive the rotatable member thereon;
   means for supplying pressurized gas to the passageway and out through the outwardly extending slots to float the rotatable member out of contact with the arbor;
   said slots being evenly spaced around the periphery of the arbor to support the rotatable member concentrically on the arbor;
   said slots extending outwardly toward the periphery of the arbor at an angle such that the gas exiting therefrom acts in opposition to the movement of the rotatable member to apply a drag thereto; and
   means for communicating the gas from the passageway to an area between the bottom end of the rotatable member and an end portion of the arbor so as to provide a gas thrust bearing.

17. Apparatus as recited in claim 16, which includes:
   a weighted collar adapted to rest on the upstanding end of the arbor; and
   a resilient member mounted on the collar for engagement with the rotatable member to apply additional frictional drag to the member.

18. Apparatus for supporting a rotatable member, which comprises:
   a vertically disposed arbor having a longitudinally extending passageway and radially extending slots communicating therewith, the arbor being adapted to receive the rotatable member thereon;
   means for supplying pressurized gas to the passageway and out through the radial slots to float the rotatable member out of contact with the arbor;
   said radially extending slots being evenly spaced around the periphery of the arbor to support the rotatable member concentrically on the arbor;
   means for communicating the gas from the passageway to an area between the bottom end of the rotatable member and an end portion of the arbor so as to provide a gas thrust bearing; and
   said communicating means including a plurality of angularly and upwardly directed ports for applying a force in opposition to the direction of rotation to apply a drag to the rotatable member.

19. Apparatus as recited in claim 18, which includes:
   a weighted collar adapted to rest on the upstanding end of the arbor; and
   a resilient member mounted on the collar for engagement with the rotatable member to apply additional frictional drag to the member.

20. Apparatus for supporting a rotatable spool having a supply of wire thereon which is to be paid out and a flange at each end, which apparatus comprises:
   a vertically disposed arbor having a longitudinally extending central passageway and radially extending slots communicating therewith, the arbor being adapted to receive the spool thereon;
   said arbor including a base portion having angularly extending ports which communicate with the passageway and which terminate adjacent a flange of the spool;
   means for supplying pressurized gas to the central passageway and out the radial slots to float the spool out of contact with the arbor;
   said radially extending slots being evenly spaced around the periphery of the arbor to support the spool concentrically on the arbor;
   a weighted collar adapted to rest on the upstanding end of the arbor, said collar having a contacting member extending therefrom for engagement with the other flange to apply a frictional drag to the spool; and
   means for supplying pressurized gas to the angularly extending ports to provide a thrust bearing for the spool and to provide a rotational component of force so that, by inverting the spool to reverse the direction of the wire being paid off the spool, said rotational component of force is changed from additive to the drag of the contacting member to subtractive therefrom.

21. Apparatus for connecting the leading end of a metal wire between two locations on an article and then separating the wire from the second location, which apparatus comprises:
    a bonding apparatus having a bonding needle movable between a first and a second location of an article;
    a support mounted on the bonding apparatus for receiving a spool having a supply of wire wound thereon, said support including:
        an arbor having a longitudinally extending passageway and outwardly extending slots communicating therewith, the arbor being adapted to receive the spool thereon,
        means for supplying pressurized gas to the passageway and out through the slots to float the spool out of contact with the arbor,
        means for communicating the gas to an area between an end of the spool and an end portion of the arbor so as to provide a gas thrust bearing, and
        means for applying a drag to the spool in opposition to the direction of rotation to effect controlled rotation thereof;
    means for moving the bonding needle to the first location and for effecting a bond between the leading end of the wire and the first location;
    means for moving the bonding needle to the second location while paying off wire from the spool to span an increment of wire from the first location to the second location;
    means for effecting a bond between the second location and the wire which is juxtaposed thereto and weakening the tensile strength of the wire, at the point of the second bond, between wire which is connected to the second location and the remainder of the wire on the spool;
    means rendered effective after the formation of the second bond for terminating the supply of pressurized gas and for pulling a partial vacuum through the passageway and slots to clamp the spool to the arbor and prevent further paying off of the wire; and
    means for moving the bonding apparatus and the clamped spool away from the second location to sever the wire at the weakened point from the wire which is bonded at that location.

22. Apparatus as recited in claim 21, further comprising a precision flanged adapter for insertion into the axial hole of the spool so that the precision flange of the adapter adjoins one of the flanges of the spool.

23. An adapter, for use with a spool having an axial hole and an imprecise flange at one of its ends to adapt said spool so that it can be supported by an air bearing, comprising:
    a hollow sleeve; and
    a precision flange at one end, only, of said sleeve, the sleeve of said adapter being capable of being inserted into the axial hole of said spool so that the precision flange of said adapter adjoins the imprecise flange of said spool.

24. A method of adapting a spool having an axial hole and an imprecise flange at one of its ends so that said spool can be supported by an air bearing, comprising:
    inserting a precision flanged sleeve adapter into the axial hole of said spool so that the precision flange of said adapter adjoins the imprecise flange of the spool.

25. Apparatus for supporting a rotatable spool having a supply of wire thereon which is to be paid out and a flange at each end, which apparatus comprises:
    a precision flanged adapter having a sleeve inserted into the axial hole of said spool at one of said ends so that the precision flange of the device adjoins and covers one of the flanges of the spool;
    a vertically disposed arbor having a longitudinally extending central passageway and radially extending slots communicating therewith, the arbor being adapted to receive the spool and adapter thereon;
    said arbor including a base portion having angularly extending ports which communicate with the passageway and which terminate adjacent the precision flange of the adapter;
    means for supplying pressurized gas to the central passageway and out the radial slots to float the spool out of contact with the arbor;
    said radially extending slots being evenly spaced around the periphery of the arbor to support the spool concentrically on the arbor;
    a weighted collar adapted to rest on the upstanding end of the arbor, said collar having a contacting member extending therefrom for engagement with the other flange of the spool to apply a frictional drag thereto; and
    means for supplying pressurized gas to the angularly extending ports to provide a thrust bearing for the spool and to provide a rotational component of force so that, by inverting the spool—and also transferring the adapter to the other end of the spool for adjoinment with the other spool flange—to reverse the direction of the wire being paid off the spool, said rotational component of force is changed from additive to the drag of the contacting member to subtractive therefrom.

References Cited

UNITED STATES PATENTS 3,363,818   1/1968   Miller _____ 228—3

RICHARD H. EANES, JR., Primary Examiner

U.S. Cl. X.R.

228—47

UNITED STATES PATENT OFFICE
CERTIFICATE OF CORRECTION

Patent No. 3,486,677      Dated December 30, 1969

Inventor(s) Michael K. Avedissian

It is certified that error appears in the above-identified patent and that said Letters Patent are hereby corrected as shown below:

Column 4, line 52, "as", second occurrence, should read -- an --. Column 6, line 24, "31" should read -- 13 --; line 63, "of", second occurrence, should read -- to --. Column 9, line 57, "(2g/a)" should read -- (a/2g) --.

Signed and sealed this 11th day of August 1970.

(SEAL)
Attest:

EDWARD M. FLETCHER, JR.      WILLIAM E. SCHUYLER, JR.
Attesting Officer      Commissioner of Patents